United States Patent
Chen et al.

(10) Patent No.: US 8,054,047 B2
(45) Date of Patent: Nov. 8, 2011

(54) BATTERY PACK CHARGING SYSTEM AND METHOD

(75) Inventors: Qijun Chen, Spring, TX (US); Thomas P. Sawyers, Hempstead, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 293 days.

(21) Appl. No.: 11/583,314

(22) Filed: Oct. 18, 2006

(65) Prior Publication Data

US 2008/0094026 A1    Apr. 24, 2008

(51) Int. Cl.
*H02J 7/04* (2006.01)

(52) U.S. Cl. .................. 320/162; 320/107; 320/110

(58) Field of Classification Search .............. 320/162, 320/110, 119, 107
See application file for complete search history.

(56) References Cited

U.S. PATENT DOCUMENTS

| | | | |
|---|---|---|---|
| 5,237,257 A * | 8/1993 | Johnson et al. | 320/106 |
| 5,387,857 A | 2/1995 | Honda et al. | |
| 5,422,558 A | 6/1995 | Stewart | |
| 5,734,254 A | 3/1998 | Stephens | |
| 6,002,240 A * | 12/1999 | McMahan et al. | 320/150 |
| 6,018,229 A | 1/2000 | Mitchell et al. | |
| 6,211,648 B1 | 4/2001 | Chew | |
| 6,224,996 B1 | 5/2001 | Bovio et al. | |
| 6,577,883 B1 | 6/2003 | Ueda | |
| 6,983,212 B2 | 1/2006 | Burns | |

FOREIGN PATENT DOCUMENTS

| | | |
|---|---|---|
| EP | 0766363 | 4/1997 |
| WO | 9922433 | 5/1999 |

OTHER PUBLICATIONS

International Search Report Dated May 30, 2008.

* cited by examiner

*Primary Examiner* — Edward Tso
*Assistant Examiner* — Aaron Piggush

(57) ABSTRACT

A battery pack charging system comprises a charger configured to be removably coupled to at least two different battery packs each having a different regulation charge voltage associated therewith, and a charger controller configured to cause the charger to charge the at least two different battery packs to the respective regulation charge voltages based on a signal received from each of the respective battery packs.

20 Claims, 2 Drawing Sheets

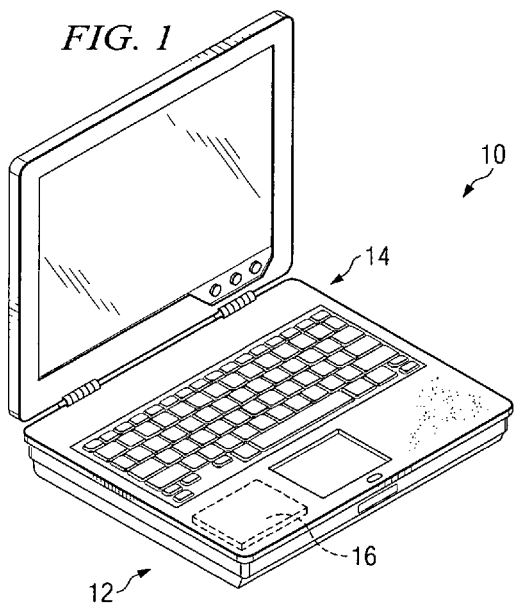
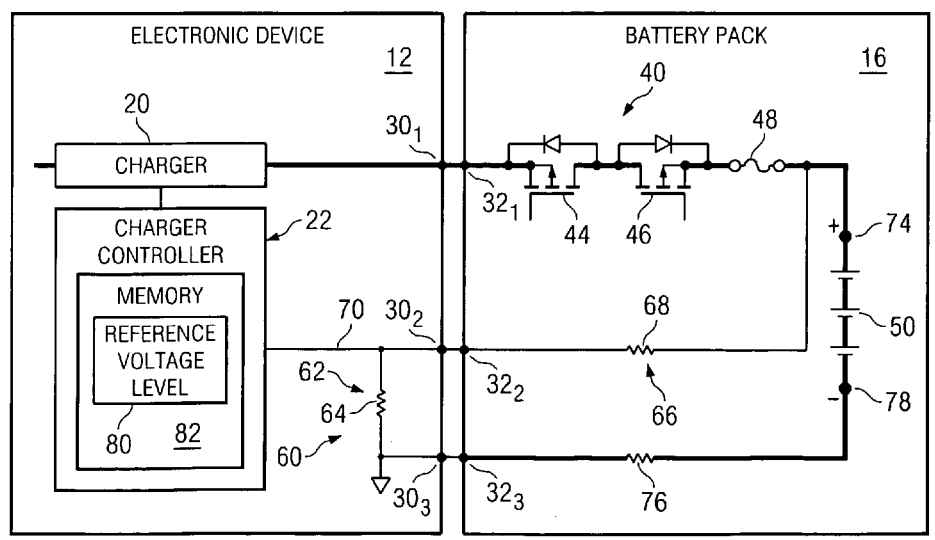

BATTERY PACK CHARGING SYSTEM AND METHOD

BACKGROUND

There are a variety of different types of battery packs configured to power various types of electronic devices. However, the charging characteristics for the various battery packs differ (e.g., a battery pack that includes three lithium ion cells needs to be charged to a different level than a lithium ion battery that contains four cells). Thus, if a four-cell battery pack is charged to the level required for a three-cell battery pack, the four-cell battery pack will be under-charged, which will generally cause an undesirable shortening of the useful life of the battery pack. Additionally, the physical configuration of a battery charging system (and any device the charging system may be disposed in, such as a notebook computer or other type of electronic device) and the physical configuration of the battery pack itself introduce errors into the battery charging process. For example, contact resistance between the charging system and the battery pack, discrete components that lay between the charging system and terminals of the battery pack, and distributed impedances present in voltage sensing and charging circuits cause the charging system to charge the battery pack to a voltage lower than the maximum allowed for the battery pack.

BRIEF DESCRIPTION OF THE DRAWINGS

FIG. 1 is a diagram illustrating an embodiment of a battery pack charging system employed in an electronic device to advantage;

FIG. 2 is a circuit diagram illustrating an embodiment of a battery pack charging system.

DETAILED DESCRIPTION OF THE DRAWINGS

Figure 3:
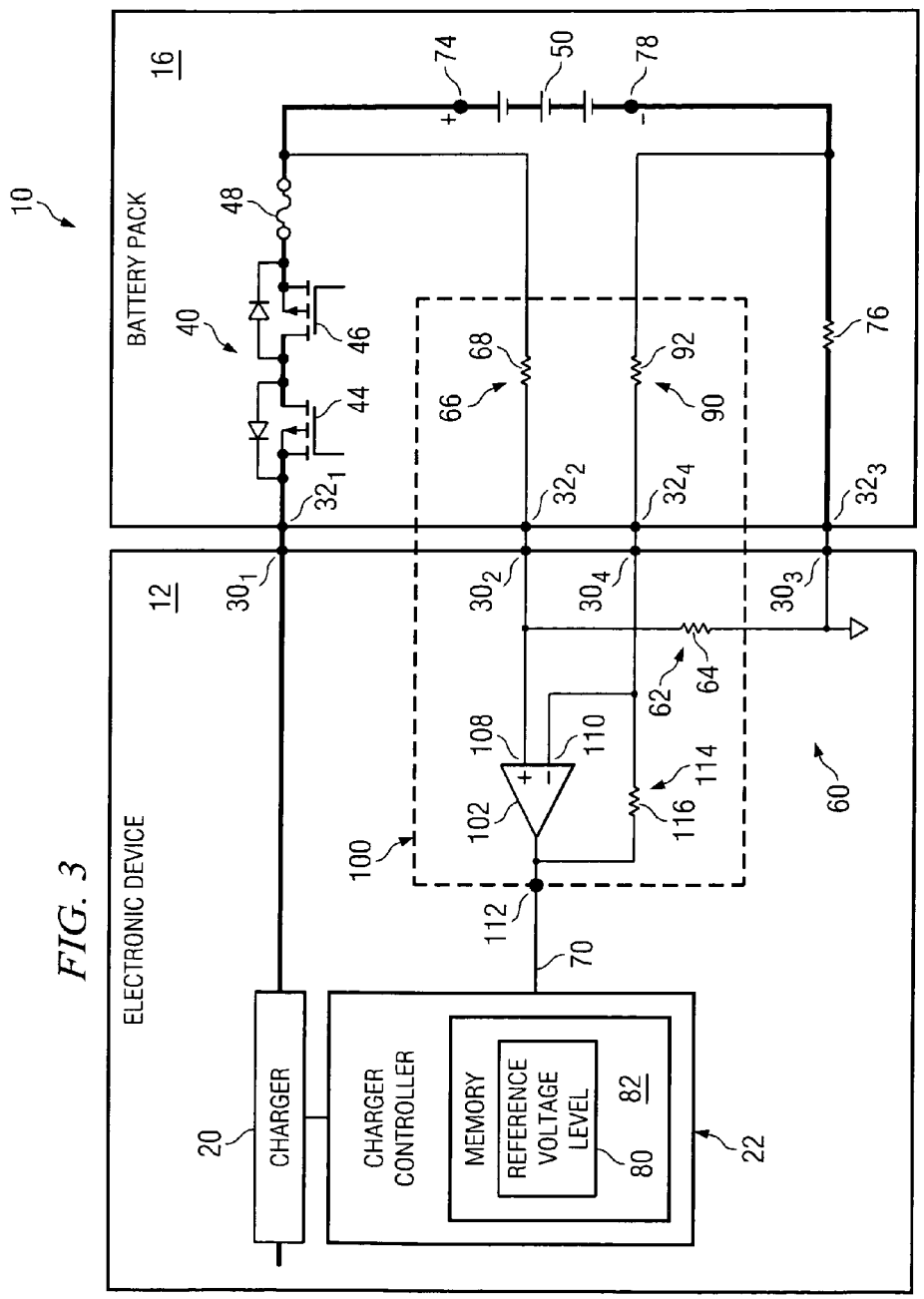
FIG. 3 is a circuit diagram illustrating another embodiment of a battery pack charging system.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of a battery pack charging system 10 employed in an electronic device 12 to advantage. In the embodiment illustrated in FIG. 1, electronic device 12 comprises a laptop or notebook computer 14. However, it should be understood that embodiments of battery pack charging system 10 may be employed to advantage in a variety of other types of electronic devices and/or configurations such as, but not limited to, a cellular telephone, tablet computer, convertible portable computer, stand-alone battery charger, or any other type of device, portable or non-portable, configured to charge a rechargeable battery pack.

In the embodiment illustrated in FIG. 1, electronic device 12 comprises a battery pack 16 for providing power to electronic device 12; however, it should be understood that electronic device 12 may be otherwise powered (e.g., via an alternating current power source). In FIG. 1, battery pack 16 is illustrated as an internal battery pack 16 (i.e., configured to be located or disposed within electronic device 12). However, it should be understood that battery pack 16 may comprise an external battery pack 16 (e.g., a travel battery pack). Battery pack charging system 10 is used to control recharging of battery pack 16. For example, battery pack 16 may comprise any type of rechargeable battery pack such as, but not limited to, a lithium ion, nickel metal hydride, nickel cadmium, lithium ion polymer or other type of battery pack 16. Further, it should be understood that battery pack 16 may comprise different quantities of battery cells and/or different cell chemistries (e.g., lithium ion battery packs 16 having different charge voltage ratings per cell).

FIG. 2 is a circuit diagram illustrating an embodiment of battery pack charging system 10. In the embodiment illustrated in FIG. 2, charging system 10 comprises a charger 20 and a charger controller 22 disposed within electronic device 12. Charger 20 and/or charger controller 22 may comprise hardware, software, firmware, or a combination thereof, and may also comprise a microprocessor or other type of processing element. In FIG. 2, electronic device 12 comprises terminal contacts $30_1$, $30_2$ and $30_3$ for removably coupling charger 20 and charger controller 22 to corresponding terminal contacts $32_1$, $32_2$ and $32_3$ of battery pack 16. In the embodiment illustrated in FIG. 2, battery pack 16 comprises a switch 40 in the form of field effect transistors (FETs) 44 and 46, respectively, and a fuse 48 coupled in series between terminal contact $32_1$ and battery cells 50 of battery pack 16. In FIG. 2, three battery cells 50 are illustrated in battery pack 16. However, it should be understood that a greater or fewer quantity of cells 50 may be disposed within battery pack 16.

In the embodiment illustrated in FIG. 2, charging system 10 comprises a sensing circuit 60 in the form of a voltage divider having a sensing element 62, such as a sensing resistor 64, and a sensing element 66, such as a sensing resistor 68. In FIG. 2, sensing element 62 is disposed in electronic device 12 coupled between a feedback path 70 of circuit 60 (extending from terminal contact $30_2$ to charger controller 22) and terminal contact $30_3$. In the embodiment illustrated in FIG. 2, sensing element 66 is disposed in battery pack 16 and coupled between terminal contact $32_2$ and a positive terminal 74 of battery cells 50. Thus, embodiments of system 10 form voltage divider sensing circuit 60 in response to coupling of a particular battery pack 16 to charger 20 and/or charger controller 22. As used herein, "forming" the voltage divider sensing circuit 60 in response to coupling a particular battery pack 16 to charger 20 and/or charger controller 22 shall mean physically linking or coupling together the components used to establish a voltage divider circuit (e.g., sensing elements 62 and 66). In the embodiment illustrated in FIG. 2, system 10 comprises a current sensing resistor 76 disposed in battery pack 16 and coupled between a negative terminal 78 of battery cells 50 and terminal contact $32_3$.

In operation, charger controller 22 receives a signal from feedback path 70 of sensing circuit 60 and uses the signal to regulate the voltage applied by charger 20 to battery pack 16 to recharge battery pack 16. For example, charger controller 22 is preferably configured to control the level of recharge voltage supplied by charger 20 based on a predetermined reference voltage level 80 which, in FIG. 2, is stored in a memory 82 of charger controller 22; however, it should be understood that reference voltage level 80 may be stored in hardware (e.g., in charger controller 22). In operation, charger controller 22 compares the signal received on feedback path 70 to the reference voltage level 80 and, in response to the signal reaching the stored reference voltage level 80 (which is indicative of the desired regulation or clamp voltage of battery pack 16), causes charger 20 to regulate or clamp the voltage at positive terminal 74 of cells 50.

In the embodiment illustrated in FIG. 2, sensing element 62 is selected or set to a predetermined value or resistance based on the reference voltage level 80. Sensing element 66 is preferably selected or set to a predetermined value or resistance based on a characteristic of the particular battery pack 16, such as the regulation or clamp voltage of a particular battery pack 16, such that, depending on the value of sensing element 66, charger 20 is controlled to deliver a voltage level to cells 50 equal to (i.e., equal to or approximately equal to) the desired regulation voltage of battery pack 16. For example, sensing element 66 is preferably selected based on a particular battery pack 16 such that the particular combination of sensing elements 62 and 66 results in a desired regulation voltage level for the particular battery pack 16. Thus, for example, if a particular battery pack 16 requires a greater level of regulation charge voltage (e.g., a four-cell battery pack 16 as opposed to a three-cell battery pack 16), the value or resistance of sensing element 66 for a four-cell battery pack 16 is selected to be greater than the value or resistance of sensing element 66 for a three-cell battery pack 16. Accordingly, because of a greater value or resistance of sensing element 66 for a four-cell battery pack 16 than for a three-cell battery pack 16, a greater level of voltage would have to supplied by charger 20 to reach the reference voltage level 80 (e.g., as detected or sensed by charger controller 22 from the signal received on feedback path 70).

Thus, selecting a value of sensing element 66 for a particular battery pack 16 enables charger 20 to charge to different voltage levels without modification to charger 20. In operation, when the signal on feedback path 70 reaches the reference voltage level 80, charger controller 22 causes charger 20 to regulate the voltage of battery pack 16. Different values or resistances of sensing element 66 for different battery packs 16 combined with a constant value or resistance of sensing element 62 thereby results in different clamp voltages for the different battery packs (i.e., base on the selected sensing element 66). Thus, by selecting sensing element 66 for a particular clamp voltage level for a particular battery pack 16, sensing element 66, in effect, is used to program (or set) the desired voltage at which the charge controller 22/charger 20 clamps the charging voltage for the battery pack 16. Thus, embodiments of system 10 enable at least two different battery packs 16 each having a different regulation charge voltage associated therewith to be removably coupled to charger 20/charge controller 22 (e.g., interchangeably coupled to charger 20/charge controller 22) such that the charger 20 charges the respective battery pack 16 to its regulation charge voltage.

Embodiments of system 10 also reduce error in detecting or sensing the regulation voltage level that may otherwise be caused by system impedances. For example, as current flows through battery pack 16, impedances caused by contact resistance (e.g., at terminal contacts 32), switches 40 and 42, fuse 48, and other components in the current path generate a voltage drop that is superimposed on the voltage across battery pack 16, which can affect the signal received by charge controller 22 on feedback path 70. Embodiments of system 10 significantly reduce the effect of these impedances by locating and/or otherwise coupling sensing element 66 in close proximity to the positive terminal 74 of battery cells 50. Thus, some or all of the sources of impedance between the sensing element 66 and charger 20 are no longer sensed by sensing circuit 60 (e.g., switch 40 and fuse 48).

FIG. 3 is a circuit diagram illustrating another embodiment of battery pack charging system 10. In the embodiment illustrated in FIG. 3, charging system 10 comprises a differential amplifier 100 formed by an operational amplifier 102, sensing resistor 64, sensing resistor 68, a sensing element 90 (such as a sensing resistor 92), and a sensing element 114 (such as a sensing resistor 116). In FIG. 3, sensing element 90 is disposed in battery pack 16 and coupled between negative terminal 78 of battery cells 50 and a terminal contact $32_4$ of battery pack 16. An input terminal 108 of operational amplifier 100 is coupled to terminal contact $30_2$ and an input terminal 110 of operational amplifier 100 is coupled to terminal contact $30_4$ of electronic device 12. In the embodiment illustrated in FIG. 3, an output terminal 112 of differential amplifier 100 corresponding to feedback path 70 is coupled to charger controller 22, and sensing element 114 is coupled between input terminal 110 and output 112. Preferably, sensing elements 66 and 90 are configured having the same value or resistance. Further, the ratio of values or resistances of sensing element 114 to sensing element 90 is equal (i.e., equal or substantially equal) to the ratio of values or resistances of sensing element 62 to sensing element 66. Because sensing element 90 is coupled close to negative terminal 78 of battery cells 50, the effect of impedance from negative terminal 78 to terminal contact $30_3$ that would otherwise be introduced into the signal on feedback path 70 is substantially reduced or eliminated.

Thus, embodiments of system 10 enable a battery pack 16 to dictate and/or otherwise control the voltage level supplied by a charger 20 for charging the battery pack 16 to the regulation voltage of the battery pack 16, thereby enabling a single charger 20 to charge battery packs 16 having different regulation voltages. Further, embodiments of system 10 substantially reduce or eliminate errors in detecting or sensing the regulation voltage signal caused by impedances caused by system components.

What is claimed is:

1. A battery pack charging system, comprising:
   a charger configured to be removably coupled to at least two different battery packs each having a different regulation charge voltage associated therewith;
   a charger controller configured to cause the charger to charge the at least two different battery packs to the respective regulation charge voltages based on a signal received from each of the respective battery packs; and
   a battery pack from the at least two different battery packs comprising:
      one or more battery cells having a positive terminal and a negative terminal;
      at least one switch connected at one end to the positive terminal and directly connected at another end to a first terminal of the battery pack for electrical connection to the charger; and
      a sensing element directly connected at one end to the positive terminal and directly connected at another end to a second terminal of the battery pack, the sensing element configured to provide the signal to the charger controller via the second terminal.

2. The system of claim 1, wherein the charger controller is configured to compare the signal to a predetermined reference voltage value.

3. The system of claim 1, wherein the charger regulates charging one of the at least two different battery packs coupled to the charger in response to the signal from the one battery pack reaching a predetermined reference voltage.

4. The system of claim 1, further comprising a sensing element coupled to the charger controller and configured to cooperate with a sensing element disposed on each of the at least two different battery packs to indicate the respective regulation charge voltages.

5. The system of claim 1, further comprising a differential amplifier disposed in a feedback path of the signal.

6. The system of claim 1, further comprising a voltage divider sensing circuit formed in response to coupling of the battery pack to the charger.

7. The system of claim 1, where the sensing element is connected in close proximity to the positive terminal of the one or more battery cells to reduce an effect of impedances from the at least one switch connected between the sensing element and the charger.

8. A battery pack charging system, comprising:
- a charger configured to charge a battery pack removably coupled thereto;
- a voltage divider sensing circuit comprising a plurality of sensing elements, at least a first sensing element of the plurality of sensing elements disposed in the charger and at least a second sensing element of the plurality of sensing elements disposed in the battery pack, wherein when the battery pack is coupled to the charger, the voltage divider sensing circuit indicates a regulation charge voltage for the battery pack; and
- the battery pack comprising:
  - one or more battery cells having a positive terminal and a negative terminal;
  - at least one switch connected at one end to the positive terminal and directly connected at another end to a first terminal of the battery pack for electrical connection to the charger; and
  - the second sensing element directly connected at one end to the positive terminal and directly connected at another end to a second terminal of the battery pack for electrically connecting to the first sensing element, the second sensing element configured to provide a signal to the second terminal used for determining the regulation charge voltage.

9. The system of claim 8, wherein the at least one sensing element disposed in the battery pack comprises a value selected based on the regulation charge voltage.

10. The system of claim 8, further comprising a charger controller configured to compare a signal from the voltage divider sensing circuit with a predetermined reference voltage.

11. The system of claim 10, wherein the charger controller is configured to cause the charger to regulate charging the battery pack coupled thereto in response to the signal reaching the predetermined reference voltage.

12. The system of claim 8, wherein the voltage divider sensing circuit comprises a differential amplifier disposed in a feedback path of a signal indicative of the regulation charge voltage.

13. The system of claim 8, wherein the second sensing element disposed in the battery pack is coupled at the one end between the at least one switch of the battery pack and the positive terminal of the one or more battery cells of the battery pack.

14. The system of claim 8, wherein the at least one sensing element disposed in the battery pack is coupled between a fuse of the battery pack and a battery cell of the battery pack.

15. The system of claim 8, further comprising a charger controller configured to cause the charger to clamp the battery pack to the regulation charge voltage based on a signal received from the voltage divider sensing circuit.

16. A battery pack charging system, comprising:
- means for removably coupling a charging means to a battery means; and
- a voltage divider means comprising a plurality of sensing element means, at least a first sensing element of the plurality of sensing element means disposed in the charging means and at least a second sensing element of the plurality of sensing element means disposed in the battery means, wherein when the battery means is coupled to the charging means, the voltage divider means indicates a regulation charge voltage for the battery means; and
- the battery means comprising:
  - one or more battery cells having a positive terminal and a negative terminal;
  - at least one switch connected at one end to the positive terminal and directly connected at another end to a first terminal of the battery means for electrical connection to the charger; and
  - the second sensing element directly connected at one end to the positive terminal and directly connected at another end to a second terminal of the battery means for electrically connecting to the first sensing element, the second sensing element configured to provide a signal to the second terminal used for determining the regulation charge voltage.

17. The system of claim 16, wherein the at least one sensing means disposed in the battery means comprises a value selected based on the regulation charge voltage.

18. The system of claim 16, further comprising means for comparing a signal received from the voltage divider means with a predetermined reference voltage.

19. The system of claim 16, further comprising means for causing the charging means to regulate charging the battery means coupled thereto in response to a signal of the voltage divider means reaching a predetermined reference voltage.

20. The system of claim 16, wherein the second sensing element disposed in the battery means is connected at the one end between the at least one switch of the battery means and the positive terminal of the one or more battery cells connected in series.

* * * * *